US012232590B2

(12) United States Patent
Han

(10) Patent No.: US 12,232,590 B2
(45) Date of Patent: Feb. 25, 2025

(54) HIGH-PENETRATION ATOMIZING BEAUTY INSTRUMENT AND ROTATING MECHANISM THEREOF

(71) Applicant: Shenzhen Tingyan Biotechnology Co., Ltd., Shenzhen (CN)

(72) Inventor: Shuqi Han, Shanghai (CN)

(73) Assignee: Shenzhen Tingyan Biotechnology Co., Ltd., Shenzhen (CN)

( * ) Notice: Subject to any disclaimer, the term of this patent is extended or adjusted under 35 U.S.C. 154(b) by 298 days.

(21) Appl. No.: 17/951,146

(22) Filed: Sep. 23, 2022

(65) Prior Publication Data

US 2023/0180912 A1 Jun. 15, 2023

(30) Foreign Application Priority Data

Dec. 13, 2021 (CN) ........................ 202111521397.5

(51) Int. Cl.
*A45D 34/00* (2006.01)
*B05B 11/10* (2023.01)

(52) U.S. Cl.
CPC .......... *A45D 34/00* (2013.01); *B05B 11/1043* (2023.01); *A45D 2034/005* (2013.01); *A45D 2200/057* (2013.01)

(58) Field of Classification Search
CPC .............. A45D 34/00; A45D 2200/057; A45D 2034/005; B05B 11/1043
See application file for complete search history.

(56) References Cited

U.S. PATENT DOCUMENTS

| | | | | |
|---|---|---|---|---|
| 6,311,903 B1 * | 11/2001 | Gaw | B05B 5/1691 | 239/708 |
| 7,178,743 B2 * | 2/2007 | Clarke, III | B05B 7/0081 | 239/398 |
| 8,757,516 B2 * | 6/2014 | Spiegel | B05B 7/068 | 239/423 |
| 2009/0200398 A1 * | 8/2009 | Duru | B05B 7/066 | 239/338 |
| 2012/0125950 A1 * | 5/2012 | Bouix | A45D 34/00 | 222/146.5 |
| 2013/0200097 A1 * | 8/2013 | Yang | H05K 13/00 | 222/52 |

(Continued)

FOREIGN PATENT DOCUMENTS

| | | | |
|---|---|---|---|
| WO | WO-2013157595 A1 * | 10/2013 | A45D 34/02 |
| WO | WO-2014085873 A1 * | 6/2014 | A45D 34/02 |

*Primary Examiner* — Nicholas D Lucchesi
(74) *Attorney, Agent, or Firm* — Bayramoglu Law Offices LLC

(57) ABSTRACT

A high-penetration atomizing beauty instrument includes a casing. The casing is provided therein with an atomizing nozzle located at an end of the casing, an atomizing mechanism connected to the nozzle, and an air-liquid tube shaft provided with a slot at a middle position. The length direction of the slot is perpendicular to the axial direction of the air-liquid tube shaft, and one end of the air-liquid tube shaft is communicated with the atomizing mechanism through a first hose. A joint is provided with a linear through hole at its bottom, where the air-liquid tube shaft penetrates the through hole at the bottom of the joint such that the air-liquid tube shaft and the joint are rotatable with each other. The top of the joint is exposed to an outside of the casing to be docked with a beauty liquid bottle.

13 Claims, 5 Drawing Sheets

(56) References Cited

U.S. PATENT DOCUMENTS

| | | | | |
|---|---|---|---|---|
| 2016/0192760 | A1* | 7/2016 | Nishiura | B05B 7/2416<br>239/337 |
| 2016/0243566 | A1* | 8/2016 | Martiskainen | A45D 19/012 |
| 2017/0086561 | A1* | 3/2017 | Chen | B05B 7/0416 |
| 2017/0340087 | A1* | 11/2017 | Samain | A45D 40/26 |
| 2017/0369229 | A1* | 12/2017 | Samain | B05B 7/2472 |

* cited by examiner

HIGH-PENETRATION ATOMIZING BEAUTY INSTRUMENT AND ROTATING MECHANISM THEREOF

CROSS REFERENCE TO THE RELATED APPLICATION

This application claims priority based on Chinese patent application No. 202111521397.5 filed on Dec. 13, 2021, the entire contents of which are hereby incorporated by reference.

TECHNICAL FIELD

The present application relates to the technical field of beauty instruments and, in particular, to a high-penetration atomizing beauty instrument and a rotating mechanism thereof.

BACKGROUND

Most of the existing atomizing beauty instruments are designed based on industrial inkjet pens that are simply connected to an air pump after minor modifications. However, these atomizing beauty instruments cannot be used continuously and stably and mainly have the following disadvantages. 1. The essence is easily accumulated at the spout, which causes the spout to be clogged, and it is very inconvenient to clean up the clogged essence. 2. In order to achieve the air pressure balance in the liquid storage tank after the liquid is ejected, a small hole is simply provided at the mouth of the cup or the cup cover. The small hole is easily clogged due to liquid sedimentation in the small hole or deformation of the small hole. As a result, when the liquid in the liquid storage tank is sprayed out, the ambient air cannot enter the liquid storage tank through the small hole in time to prevent negative pressure from forming in the liquid storage tank, thereby affecting the continuous spraying of the liquid. 3. Since the original bottle containing the beauty liquid cannot be docked stably, the beauty liquid can only be poured from the original bottle into the liquid storage tank. Repeated use of the liquid storage tank is prone to secondary pollution of the beauty liquid. In addition, if the liquid storage tank is not cleaned in time, it will cause bacterial growth. 4. Due to the lack of waterproof design, the atomizing beauty instrument will be damaged due to moisture or liquid infiltration in a wet condition. 5. The beauty liquid is likely to leak from the liquid storage tank when the user carries it somewhere, and there are problems, such as cumbersome use steps, single use scene, and limited use frequency. 6. The liquid output cannot be adjusted accurately and quickly, and it is impossible or inconvenient to adjust the atomization effect when using beauty liquids of different viscosities, which is inconvenient for use in practice.

Overall, due to the lack of systematic consideration of personal skincare habits and the skincare environment, the existing atomizing beauty instruments have defects. The instrument needs frequent cleaning because the spout is easily clogged. The atomization effect is unsatisfactory because of an unreasonable air inlet structure. The beauty liquid bottle is prone to leakage and secondary pollution due to unstable docking, and the instrument is prone to damage and has a single use scenario.

SUMMARY

An objective of the present application is to overcome most if not all of the above-mentioned problems.

A first aspect of the present application provides a high-penetration atomizing beauty instrument, including:

- an air-liquid tube shaft provided with a slot at a middle position, where a length direction of the slot is perpendicular to an axial direction of the air-liquid tube shaft;
- a joint provided with a linear through hole at a bottom, where the air-liquid tube shaft penetrates the through hole at the bottom of the joint such that the air-liquid tube shaft and the joint are rotatable with each other; and
- a liquid suction tube fixed in an inner hole of the joint, having one end inserted into the slot, and movable within 90° along a circumferential direction of the air-liquid tube shaft.

The length of the outer surface of the slot is the sum of a quarter of a circumference of the air-liquid tube shaft and the outer diameter of the liquid suction tube, which restricts the maximum rotation angle between the joint and the air-liquid tube shaft to 90°.

Optionally, the air-liquid tube shaft may be provided with a vent hole located in the joint. The air-liquid tube shaft has one end configured to output a beauty liquid to be atomized and the other end provided with an air inlet, which may be communicated with outside air through a third hose.

Optionally, the air-liquid tube shaft may be sleeved with two first sealing rings located in the joint. The two first sealing rings may be respectively located at two sides of the vent hole and may be located on the same side as the slot.

Optionally, the air-liquid tube shaft may be sleeved with a second sealing ring located in the joint. The second sealing ring and the first sealing rings may be respectively located on two sides of the slot.

Another aspect of the present application provides a high-penetration atomizing beauty instrument, including a casing and a rotating mechanism. The casing further includes a nozzle located at an end of the casing and configured to output a spray to an outside of the casing and an atomizing mechanism connected to the nozzle and configured to generate the spray.

Optionally, the end of the air-liquid tube shaft configured to output the beauty liquid to be atomized may be communicated with the atomizing mechanism through a first hose.

Optionally, the casing may be further provided therein with an air pump, which may be communicated with the atomizing mechanism through a second hose and may be configured to transmit compressed air into the atomizing mechanism.

Optionally, the casing may be further provided therein with an air pump motor and an air pump motor sealing cylinder. The air pump motor may be used as a power source for the air pump. The air pump motor sealing cylinder may be configured to seal the air pump motor for waterproofing.

Optionally, the top of the joint may be exposed to the outside of the casing to be docked with a beauty liquid bottle. The mouth of the beauty liquid bottle may be provided with an outer thread. The inner side of the top of the joint may be provided with a plastic part with an inner thread, which may be matched with the outer thread at the mouth of the beauty liquid bottle.

Optionally, one side of the outer surface of the casing may be provided with an inwardly recessed chamber for accommodating the body of the beauty liquid bottle.

In the rotating mechanism of the high-penetration atomizing beauty instrument of the present disclosure, the end of the liquid suction tube is movable in the slot, and the joint is rotatable around the air-liquid tube shaft, such that the joint and the liquid suction tube can rotate about the air-liquid tube shaft at the same time. When the beauty fluid bottle is assembled, the joint is perpendicular to the casing for easy assembly. When in use, the beauty liquid bottle is rotated from a state perpendicular to the casing to a state of being fitted to the casing. The present disclosure adopts an integrated "bullet-shaped rotatable chamber" design. The beauty liquid bottle is stably placed in the chamber of the high-penetration atomizing beauty instrument for smooth liquid and air passage and convenient replacement.

In the high-penetration atomizing beauty instrument of the present application, the air pump compresses air and sends the compressed air into the atomizing mechanism through the second hose. Thus, the atomizing mechanism forms a negative pressure environment at the spout to drive the beauty liquid in an air-liquid tube shaft to enter the atomizing mechanism through a first hose for atomization. The nozzle sprays the spray to the outside.

In the present application, the original bottle of the beauty liquid can be directly and stably docked with the high-penetration atomizing beauty instrument to avoid secondary pollution and leakage of the beauty liquid.

The internal structure layout of the high-penetration atomizing beauty instrument is made waterproof and can be used in humid environments.

The following detailed description of the specific embodiments of the present application based on the drawings should help those skilled in the art to understand the above and other objectives, advantages, and features of the present disclosure.

BRIEF DESCRIPTION OF THE DRAWINGS

Some specific embodiments of the present application will be described in detail below in an illustrative rather than restrictive manner with reference to the drawings. The same reference numerals in the drawings refer to like or similar components or parts. Those skilled in the art should understand that the drawings are not plotted to scale.

REFERENCE NUMERALS

1. casing; 2. beauty liquid bottle; 3. joint; 4. air-liquid tube shaft; 5. liquid suction tube; 6. slot; and 7. vent hole; 8. nozzle; 9. atomizing mechanism; 10. air pump; 11. second hose; 12. first hose; and 13. chamber; and 14. third hose; 15. air pump motor sealing cylinder; 16. first sealing ring; 17. second sealing ring, and 18. air inlet.

DETAILED DESCRIPTION OF THE EMBODIMENTS

Figure 1:
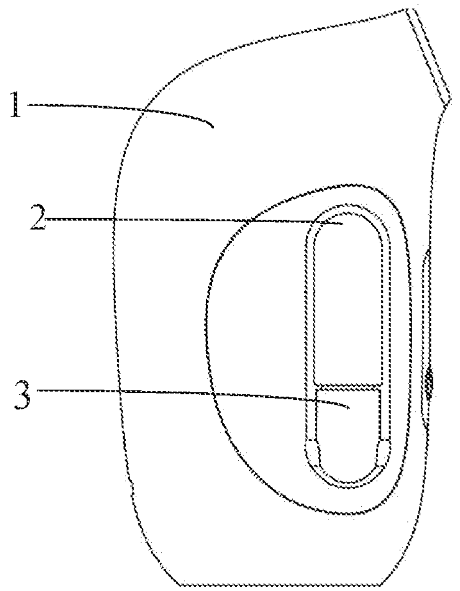
FIG. 1 is a structural diagram of a high-penetration atomizing beauty instrument according to an embodiment of the present disclosure.

FIG. 1 is a structural diagram of a high-penetration atomizing beauty instrument according to an embodiment of the present application. Referring to FIG. 1, the high-penetration atomizing beauty instrument includes a casing 1. One side of the outer surface of the casing 1 is provided with an inwardly recessed chamber 13 for accommodating the body of a beauty liquid bottle 2. One end of the chamber 13 is provided with a joint 3 extending from the inside of the casing 1 to the outside of the casing 1 for connecting the beauty liquid bottle 2 to a structure inside the casing 1.

Figure 2:
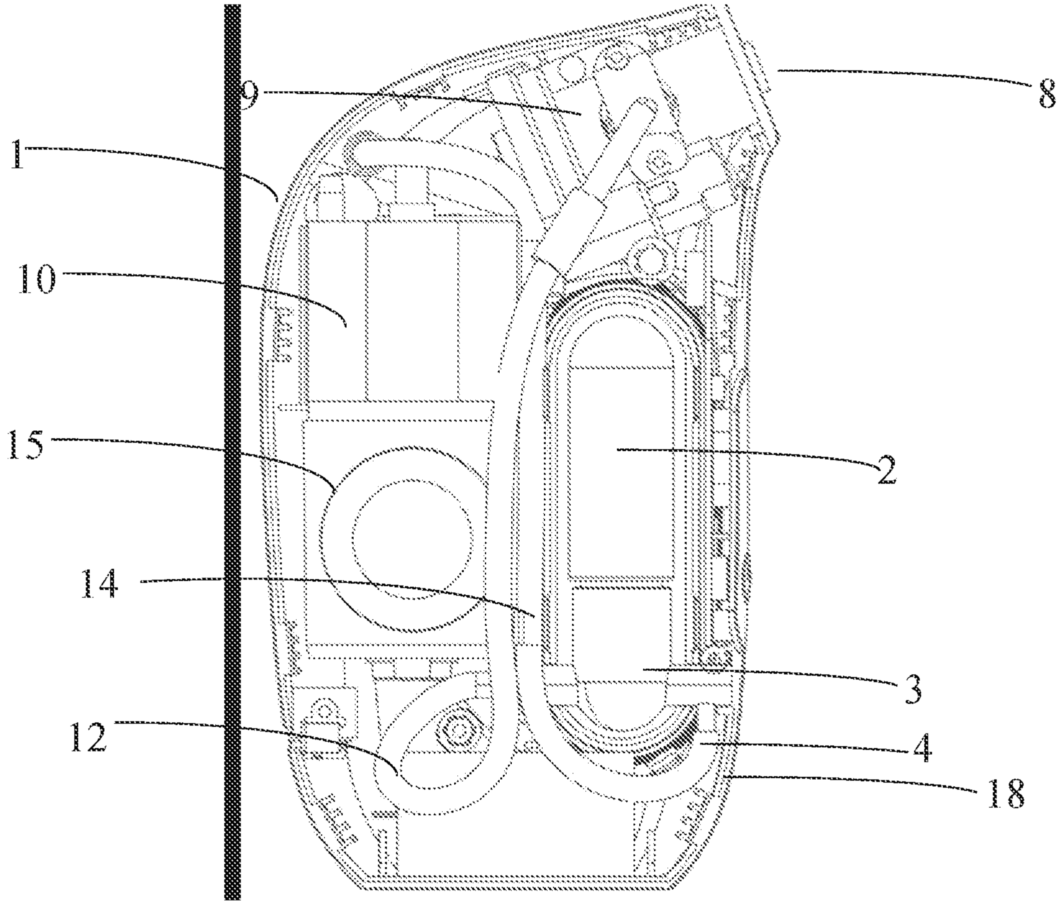
FIG. 2 is a half-section front view of the high-penetration atomizing beauty instrument shown in FIG. 1.

FIG. 2 is a half-section front view of the high-penetration atomizing beauty instrument shown in FIG. 1. Referring to FIG. 2, the casing 1 is provided therein with a nozzle 8, an atomizing mechanism 9, an air pump 10, and a rotating mechanism. The atomizing mechanism 9 is configured to atomize a beauty liquid and is connected to the nozzle 8. The nozzle 8 is located at an end of the casing 1 and is configured to output the spray to the outside of the casing 1.

In the high-penetration atomizing beauty instrument of the present application, the air pump 10 compresses and transmits air into the atomizing mechanism 9 through a second hose 11. Thus, the atomizing mechanism 9 forms a negative pressure environment at a front end of a spout to drive the beauty liquid in an air-liquid tube shaft 4 to enter the atomizing mechanism 9 through a first hose 12 for atomization. The nozzle 8 sprays the spray to the outside.

Figure 9:
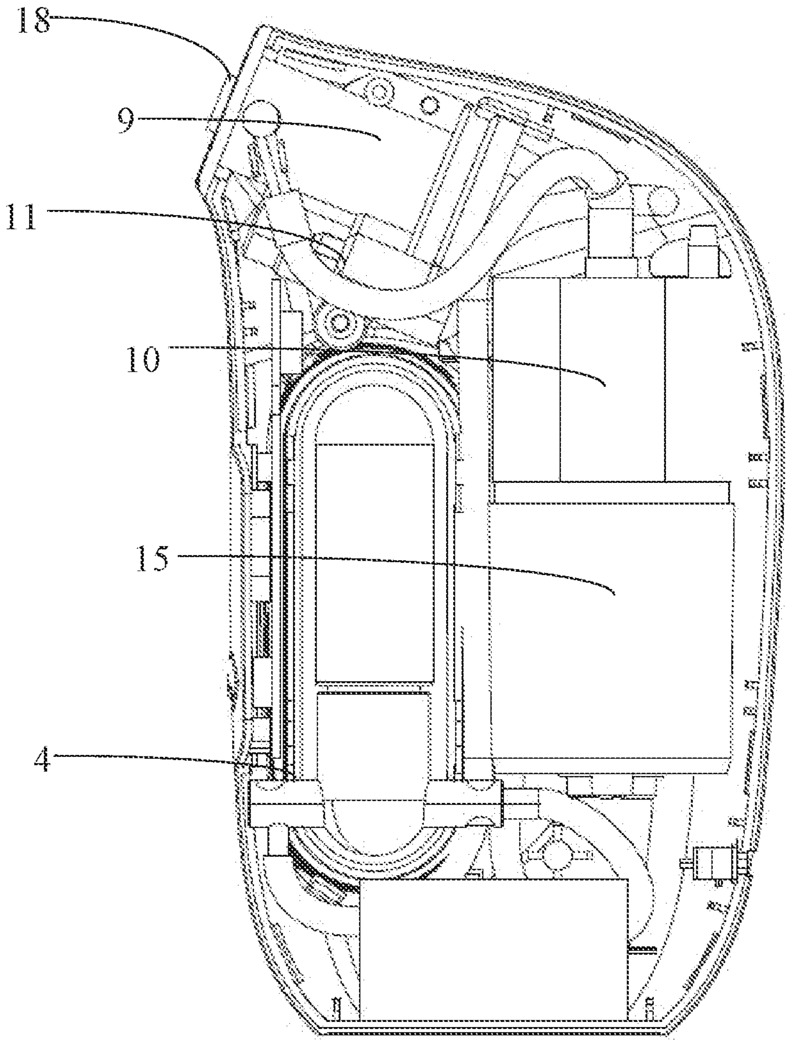
FIG. 9 is a half-section rear view of the high-penetration atomizing beauty instrument shown in FIG. 1.

FIG. 9 is a half-section rear view of the high-penetration atomizing beauty instrument shown in FIG. 1. Referring to FIG. 9, the air pump 10 communicated with the atomizing mechanism 9 through the second hose 11 and is configured to transmit the compressed air into the atomizing mechanism 9.

Figure 3:
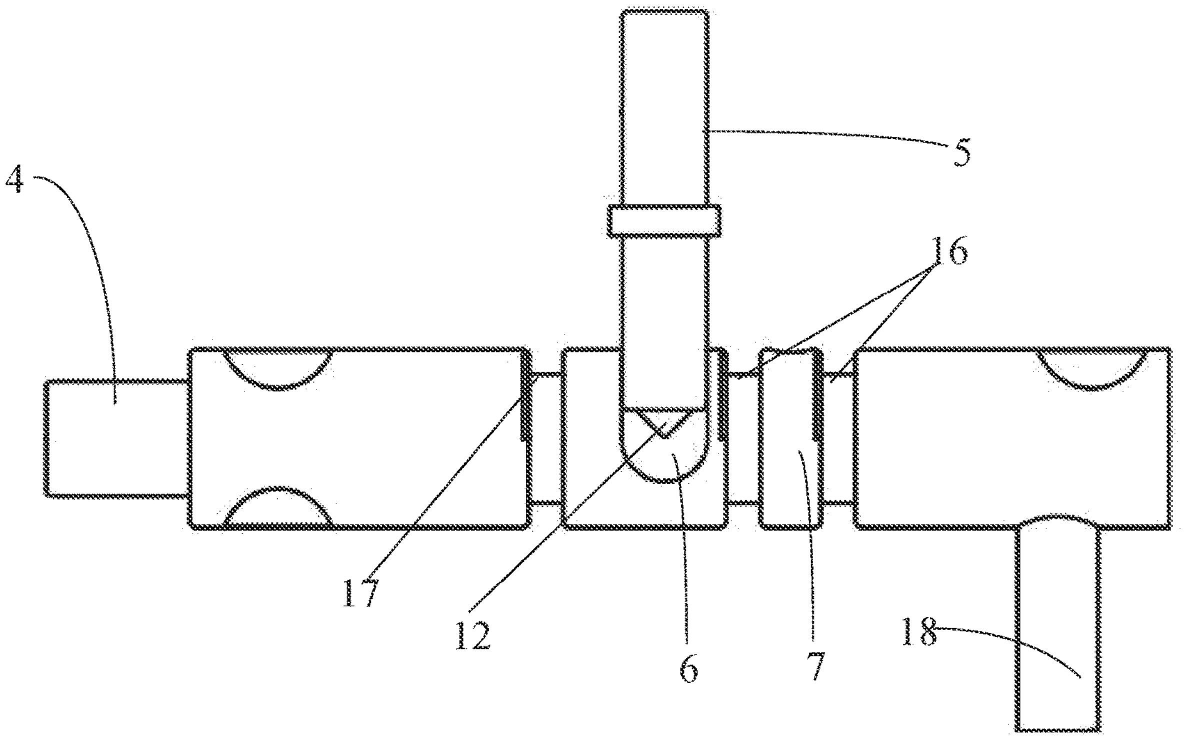
FIG. 3 is a structural diagram of a rotating mechanism of the high-penetration atomizing beauty instrument shown in FIG. 1.
Figure 10:
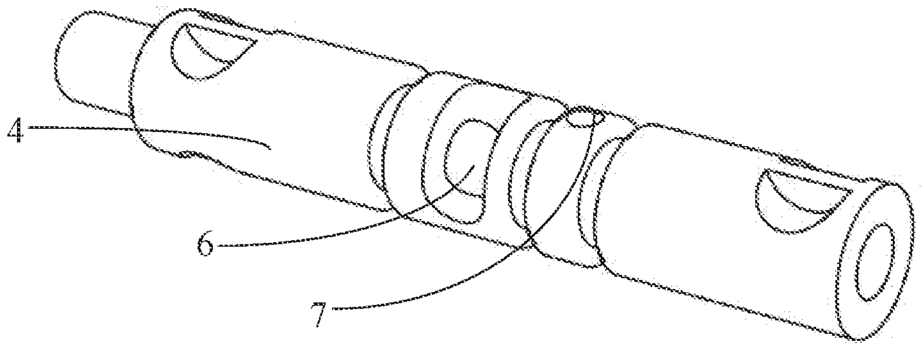
FIG. 10 is a structural diagram of the air-liquid tube shaft shown in FIG. 2.

FIG. 3 is a structural diagram of the rotating mechanism of the high-penetration atomizing beauty instrument shown in FIG. 1. FIG. 10 is a structural diagram of the air-liquid tube shaft 4 shown in FIG. 2. Referring to FIGS. 3 and 10, the rotating mechanism includes the air-liquid tube shaft 4, the joint 3, and a liquid suction tube 5. A slot 6 is provided at the middle portion of the air-liquid tube shaft 4. The length direction of the slot 6 is perpendicular to the axial direction of the air-liquid tube shaft 4. One end of the air-liquid tube shaft 4 is communicated with the atomizing mechanism 9 through the first hose 12. Referring to FIG. 3, the liquid suction tube 5 is configured to suck the beauty liquid from the beauty liquid bottle 2 into the air-liquid tube shaft 4. One end of the liquid suction tube is provided in the slot 6 and is movable along the length direction of the slot 6.

Based on the above structure, the beauty liquid in the beauty liquid bottle 2 is sucked by the liquid suction tube 5 and enters the air-liquid tube shaft 4. The negative pressure environment generated in the atomizing mechanism 9 makes the beauty liquid sucked in the air-liquid tube shaft 4 enter the atomizing mechanism 9 for atomization, thereby generating the spray.

Figure 4:
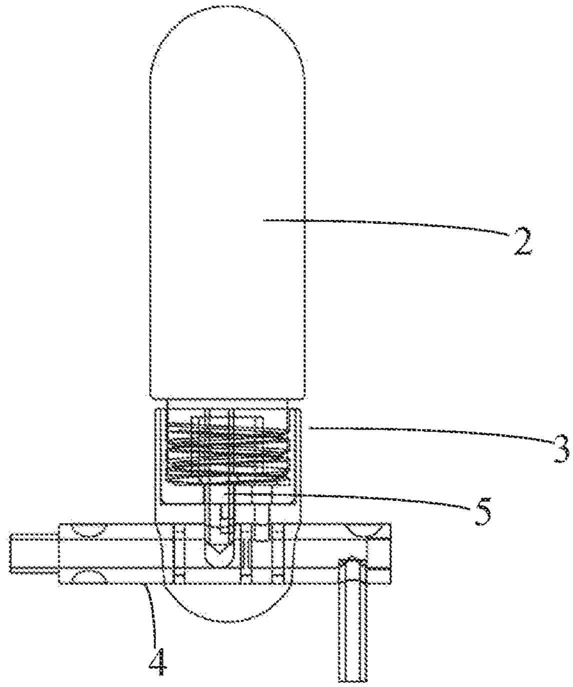
FIG. 4 is a structural diagram of the rotating mechanism of the high-penetration atomizing beauty instrument shown in FIG. 1, which is assembled with a beauty liquid bottle.

FIG. 4 is a structural diagram of the rotating mechanism of the high-penetration atomizing beauty instrument shown in FIG. 1, which is assembled with the beauty liquid bottle.

Referring to FIG. 4, the joint 3 has a structure similar to a tee. That is, the joint 3 has a linear through hole at the bottom and a vertical hole at the top, and the vertical hole is communicated with an inside of the through hole. The air-liquid tube shaft 4 penetrates the through hole at the bottom of the joint 3, such that the air-liquid tube shaft 4 and the joint 3 are rotatable with each other around the axial direction of the air-liquid tube shaft 4. The top of the joint 3 is exposed to the outside of the casing 1 to be docked with the beauty liquid bottle 2. The liquid suction tube 5 is located in and coaxial with the vertical hole at the top of the joint 3. When the joint 3 is docked with the beauty liquid bottle 2, the liquid suction tube extends into the beauty liquid bottle 2 to absorb the beauty liquid.

Based on the above structure, the joint 3 is restricted to rotate only around the axial direction of the air-liquid tube shaft 4, rather than to slide along the axial direction of the air-liquid tube shaft 4.

The liquid suction tube 5 is fixed in an inner hole of the joint 3, has one end inserted into the slot 6, and is movable within 90° along a circumferential direction of the air-liquid tube shaft 4.

Figure 8:
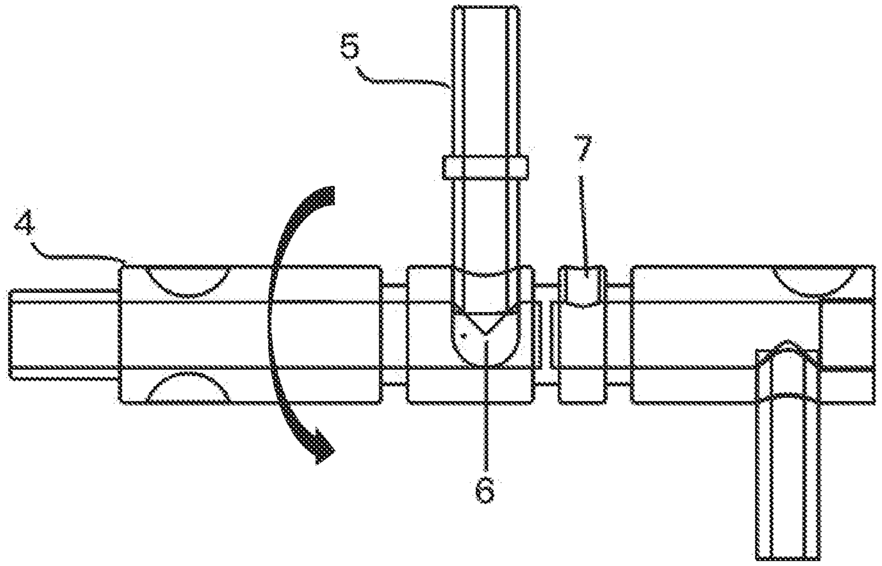
FIG. 8 is a perspective view of the rotating mechanism of the high-penetration atomizing beauty instrument shown in FIG. 3.

The outer surface of the slot 6 has a length slightly greater than a quarter of the circumference of the air-liquid tube shaft, which restricts the maximum rotation angle between the joint 3 and the air-liquid tube shaft 4 to 90°. A rotation direction of the joint is shown in FIG. 8, and the joint rotates around the circumferential direction of the air-liquid tube shaft.

Based on the above structure, the rotation angle between the joint 3 and the air-liquid tube shaft 4 is further restricted to not exceed 90°.

The present application adopts an integrated "bullet-shaped rotatable chamber" design. The beauty liquid bottle 2 is stably placed in the chamber 13 of the high-penetration atomizing beauty instrument for smooth liquid and air passage and convenient replacement.

Referring to FIG. 4, the mouth of the beauty liquid bottle 2 is provided with an outer thread. The vertical hole at the top of the joint 3 is provided with a plastic part with an inner thread, which is matched with the outer thread at the mouth of the beauty liquid bottle 2. Since the inner thread of the joint 3 and the outer thread of the beauty liquid bottle 2 have the same specification, the joint and the beauty liquid bottle can be stably connected to achieve the desired connection effect.

In the present application, the original bottle of the beauty liquid can be directly and stably docked with the high-penetration atomizing beauty instrument to avoid secondary pollution and leakage of the beauty liquid.

FIG. 8 is a perspective view of the rotating mechanism of the high-penetration atomizing beauty instrument shown in FIG. 1. Referring to FIG. 8, the air-liquid tube shaft 4 is provided with a vent hole 7 located in the joint. The other end of the air-liquid tube shaft is provided with an air inlet 18, which is communicated with the outside air through a third hose 14.

When the beauty liquid flows out from the beauty liquid bottle 2, the outside air enters the beauty liquid bottle 2 through the vent hole 7 of the air-liquid tube shaft 4 to avoid the negative pressure environment being formed in the beauty liquid bottle 2 to affect further outflow of the beauty liquid.

Referring to FIG. 2, the casing is further provided with an air pump motor and an air pump motor sealing cylinder 15. The air pump motor is used as a power source of the air pump 10, and the air pump motor sealing cylinder 15 is configured to seal the air pump motor.

The internal structure layout of the high-penetration atomizing beauty instrument is made waterproof and can be used in humid environments.

Referring to FIG. 3, the air-liquid tube shaft 4 is sleeved with two first sealing rings 16 located in the joint 3. The two first sealing rings 16 are respectively located at two sides of the vent hole 7 and are located on the same side as the slot 6.

Based on the above structure, the two first sealing rings 16 form an air-tight environment around the vent hole 7. The air entering into the air-liquid tube shaft 4 through the vent hole 7 can only enter the beauty liquid bottle 2, such that the beauty liquid in the beauty liquid bottle 2 can flow out normally.

Referring to FIG. 3, the air-liquid tube shaft 4 is sleeved with a second sealing ring 17 located in the joint 3. The second sealing ring 17 and the first sealing rings 16 are respectively located at two sides of the slot 6. A liquid-tight environment is formed between the second sealing ring 17 and one of the first sealing rings 16 which is closer to the second sealing ring 17. When the joint 3 rotates around the air-liquid tube shaft 4, the beauty liquid will not leak along the gap between the wall of the through hole at the bottom of the joint 3 and the air-liquid tube shaft 4.

Figure 5:
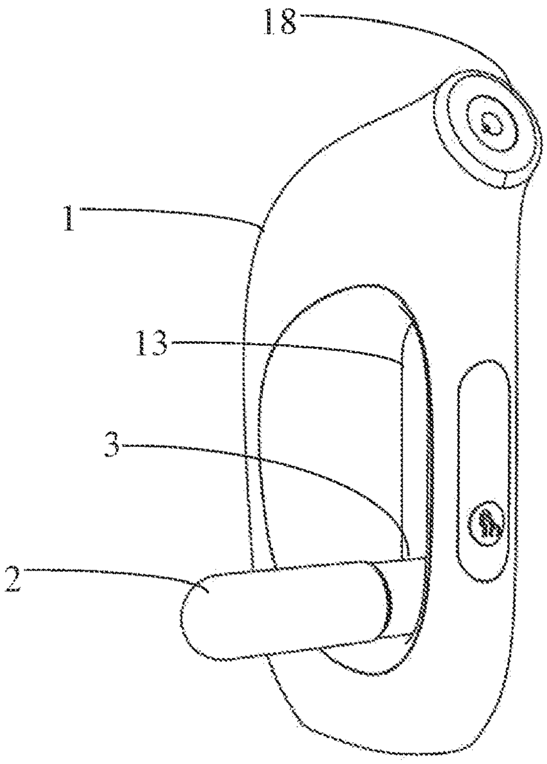
FIG. 5 is a schematic diagram of the high-penetration atomizing beauty instrument shown in FIG. 1, which is assembled with the beauty liquid bottle.
Figure 6:
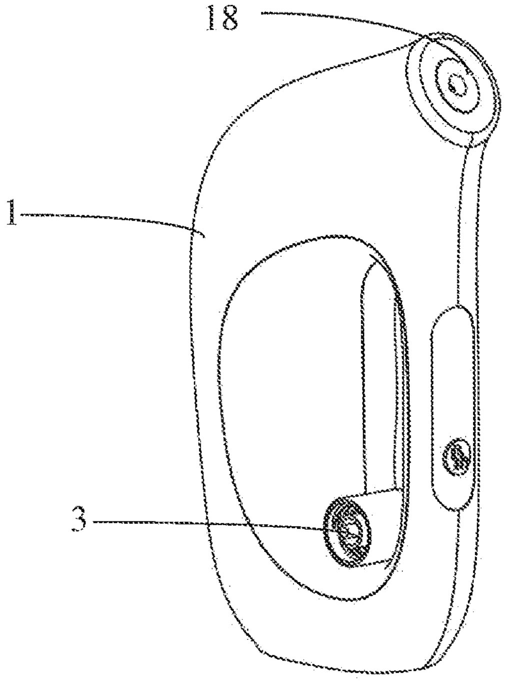
FIG. 6 is a schematic diagram of the high-penetration atomizing beauty instrument shown in FIG. 1, which is separated from the beauty liquid bottle.
Figure 7:
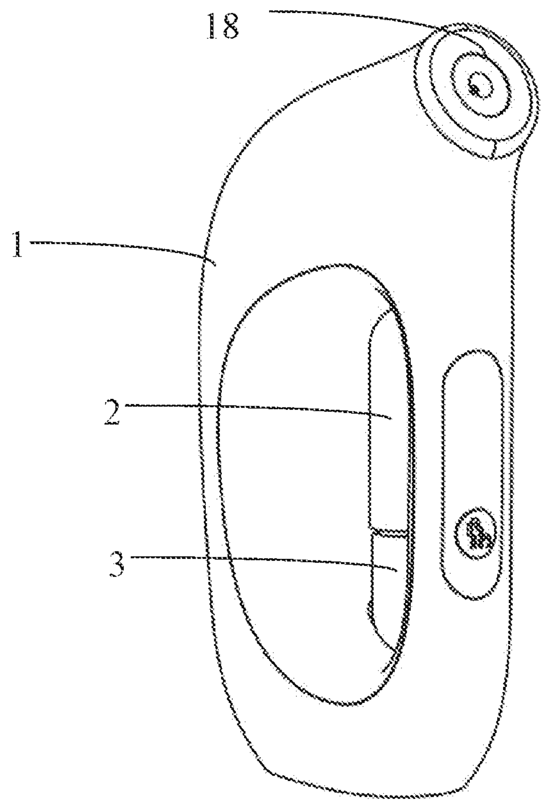
FIG. 7 is a schematic diagram of the high-penetration atomizing beauty instrument shown in FIG. 1 with the beauty liquid bottle placed in a chamber.

FIG. 5 is a schematic diagram of the high-penetration atomizing beauty instrument shown in FIG. 1, which is assembled with the beauty liquid bottle 2. FIG. 6 is a schematic diagram of the high-penetration atomizing beauty instrument shown in FIG. 1, which is separated from the beauty liquid bottle 2. FIG. 7 is a schematic diagram of the high-penetration atomizing beauty instrument shown in FIG. 1 with the beauty liquid bottle 2 placed in the chamber. In the high-penetration atomizing beauty instrument of the present application, in an idle state, the joint 3 is folded and stored in the chamber 13 on the outer surface of the casing 1. Before the beauty liquid bottle 2 is assembled, the joint 3 is manually pushed to rotate 90° around the air-liquid tube shaft 4 in the casing 1, such that the vertical hole at the top of the joint 3 is perpendicular to the casing 1 and is in a horizontally outward position, as shown in FIG. 6. The mouth of the beauty liquid bottle 2 is docked with the vertical hole of the joint 3 and screwed tightly to achieve stable docking, as shown in FIG. 5. Finally, the beauty liquid bottle 2 is manually pushed to drive the joint 3 to rotate 90°, such that the beauty liquid bottle 2 is completely placed in the chamber 13 on the outer surface of the casing 1, as shown in FIG. 7. In this way, the assembly of the beauty liquid bottle 2 is completed. After the beauty treatment is over, the above steps are operated reversely to disassemble and replace the beauty liquid bottle 2.

The overall internal structure of the high-penetration atomizing beauty instrument of the present application is compact, reasonable, waterproof, and suitable for humid environments.

It should be noted that, unless otherwise stated, the technical terms or scientific terms used herein should have the general meanings as understood by those skilled in the art to which the present disclosure belongs.

It should be noted that, in the description of the present disclosure, the terms such as "central", "longitudinal", "transverse", "long", "wide", "thick", "upper", "lower", "front", "back", "left", "right", "vertical", "horizontal", "top", "bottom", "inner", "outer", "clockwise", "anticlockwise", "axial", "radial" and "circumferential" are used to indicate orientations shown in the drawings. It should be noted that these terms are merely intended to facilitate a simple description of the present application, rather than to indicate or imply that the mentioned apparatus or elements must have a specific orientation or be constructed and operated in the specific orientation. Therefore, these terms may not be construed as a limitation to the present application.

Moreover, the terms, such as "first" and "second," are used only for the purpose of description and cannot be understood as indicating or implying relative importance or implicitly indicating the number of technical features denoted. In the description of the present application, "multiple" means two or more unless otherwise specifically defined.

In the present application, unless otherwise clearly specified, the terms, such as "mounting", "interconnection", "connection" and "fixation," are intended to be understood in a broad sense. For example, the "connection" may be a fixed, removable, or integral connection. The "connection" may be a mechanical or an electrical connection. The "connection" may be a direct or indirect connection via a medium. The "connection" may be a communication or interaction between two elements. Those of ordinary skill in the art may understand specific meanings of the above terms in the present disclosure based on a specific situation.

In the present disclosure, unless otherwise explicitly specified, when it is described that a first feature is "above" or "below" a second feature, it indicates that the first and second features are in direct contact or the first and second features are in indirect contact through an intermediate feature. In addition, when it is described that the first feature is "over", "above" and "on" the second feature, it indicates that the first feature is directly or obliquely above the second feature or that the altitude of the first feature is higher than that of the second feature. When it is described that a first feature is "under", "below", or "beneath" a second feature, it indicates that the first feature is directly or obliquely under the second feature or the first feature is lower than the second feature.

The above merely describes preferred specific implementations of the present application, but the protection scope of the present disclosure is not limited thereto. Any person skilled in the art can easily conceive modifications or replacements within the technical scope of the present application, and these modifications or replacements shall fall within the protection scope of the present disclosure. Therefore, the protection scope of the present disclosure should be subject to the protection scope of the claims.

What is claimed is:

1. A rotating mechanism adapted to be used with a high-penetration atomizing beauty instrument, comprising an air-liquid tube shaft, a joint and a liquid suction tube, wherein a slot is provided at a middle position of the air-liquid tube shaft, and a length direction of the slot is perpendicular to an axial direction of the air-liquid tube shaft;

a linear through hole is provided at a bottom of the joint and the air-liquid tube shaft penetrates the linear through hole at the bottom of the joint, and the air-liquid tube shaft and the joint are rotatable with each other; and the liquid suction tube is fixed in an inner hole of the joint, and one end of the liquid suction tube is inserted into the slot, and movable within 90° along a circumferential direction of the air-liquid tube shaft;

a length of an outer surface of the slot is a sum of a quarter of a circumference of the air-liquid tube shaft and an outer diameter of the liquid suction tube; and a maximum rotation angle between the joint and the air-liquid tube shaft is restricted to 90°.

2. The rotating mechanism according to claim 1, wherein the air-liquid tube shaft is provided with a vent hole located in the joint; and the air-liquid tube shaft has a first end configured to output a liquid to be atomized and a second end provided with an air inlet, and the air inlet is communicated with outside air through a third hose.

3. The rotating mechanism according to claim 2, wherein the air-liquid tube shaft is sleeved with two first sealing rings located in the joint, the two first sealing rings are respectively located at two sides of the vent hole, and the two first sealing rings are located at a same side of the slot.

4. The rotating mechanism according to claim 3, wherein the air-liquid tube shaft is sleeved with a second sealing ring located in the joint; and the second sealing ring and the two first sealing rings are respectively located at two sides of the slot.

5. A high-penetration atomizing beauty instrument, comprising a casing and the rotating mechanism according to claim 1, wherein the casing further comprises a nozzle and an atomizing mechanism, wherein the nozzle is located at an end of the casing and configured to output a spray to an outside of the casing, and the atomizing mechanism is connected to the nozzle and configured to generate the spray.

6. The high-penetration atomizing beauty instrument according to claim 5, wherein a first end of the air-liquid tube shaft is configured to output the liquid to be atomized and is communicated with the atomizing mechanism through a first hose.

7. The high-penetration atomizing beauty instrument according to claim 5, wherein an air pump is provided inside the casing, and the air pump is communicated with the atomizing mechanism through a second hose and is configured to transmit compressed air into the atomizing mechanism.

8. The high-penetration atomizing beauty instrument according to claim 7, wherein an air pump motor and an air pump motor sealing cylinder are provided inside the casing; the air pump motor is used as a power source of the air pump; and the air pump motor sealing cylinder is configured to seal the air pump motor.

9. The high-penetration atomizing beauty instrument according to claim 5, wherein a top of the joint is exposed to the outside of the casing to be docked with a beauty liquid bottle; a mouth of the beauty liquid bottle is provided with an outer thread; and an inner side of the top of the joint is provided with a plastic part with an inner thread, and the inner thread is matched with the outer thread at the mouth of the beauty liquid bottle.

10. The high-penetration atomizing beauty instrument according to claim 9, wherein one side of an outer surface of the casing is provided with an inwardly recessed chamber for accommodating a body of the beauty liquid bottle.

11. The high-penetration atomizing beauty instrument according to claim 5, wherein the air-liquid tube shaft is provided with a vent hole located in the joint; and the air-liquid tube shaft has a first end configured to output a liquid to be atomized and a second end provided with an air inlet, and the air inlet is communicated with outside air through a third hose.

12. The high-penetration atomizing beauty instrument according to claim 11, wherein the air-liquid tube shaft is sleeved with two first sealing rings located in the joint, the two first sealing rings are respectively located at two sides of the vent hole, and the two first sealing rings are located at a same side of the slot.

13. The high-penetration atomizing beauty instrument according to claim 12, wherein the air-liquid tube shaft is sleeved with a second sealing ring located in the joint; and the second sealing ring and the two first sealing rings are respectively located at two sides of the slot.

* * * * *